United States Patent
Irmak et al.

(10) Patent No.: US 9,135,328 B2
(45) Date of Patent: Sep. 15, 2015

(54) RANKING DOCUMENTS THROUGH CONTEXTUAL SHORTCUTS

(75) Inventors: Utku Irmak, Santa Clara, CA (US); Reiner Kraft, Gilroy, CA (US)

(73) Assignee: Yahoo! Inc., Sunnyvale, CA (US)

(*) Notice: Subject to any disclaimer, the term of this patent is extended or adjusted under 35 U.S.C. 154(b) by 480 days.

(21) Appl. No.: 12/112,721

(22) Filed: Apr. 30, 2008

(65) Prior Publication Data
US 2009/0276399 A1 Nov. 5, 2009

(51) Int. Cl.
*G06F 7/00* (2006.01)
*G06F 17/30* (2006.01)

(52) U.S. Cl.
CPC ........ *G06F 17/3064* (2013.01); *G06F 17/3089* (2013.01)

(58) Field of Classification Search
CPC .......... G06F 17/3089; G06F 17/30699; G06Q 30/0269; G06Q 50/01
USPC .......... 707/726, 723, 722, 705, 758, 999.003, 707/999.001
See application file for complete search history.

(56) References Cited

U.S. PATENT DOCUMENTS

| | | | |
|---|---|---|---|
| 5,802,515 A | 9/1998 | Adar et al. | |
| 5,987,446 A | 11/1999 | Corey et al. | |
| 6,021,409 A | 2/2000 | Burrows | |
| 6,202,063 B1 | 3/2001 | Benedikt et al. | |
| 6,678,694 B1* | 1/2004 | Zimmermann et al. | 707/731 |
| 6,681,247 B1* | 1/2004 | Payton | 709/217 |
| 6,691,108 B2 | 2/2004 | Li | |
| 6,701,311 B2 | 3/2004 | Biebesheimer et al. | |
| 6,772,139 B1* | 8/2004 | Smith, III | 707/748 |
| 7,031,961 B2 | 4/2006 | Pitkow et al. | |
| 7,058,944 B1* | 6/2006 | Sponheim et al. | 718/100 |
| 7,181,680 B2* | 2/2007 | Lin et al. | 715/229 |
| 7,240,064 B2 | 7/2007 | Risvik et al. | |
| 7,631,263 B2 | 12/2009 | Morris | |
| 7,693,827 B2 | 4/2010 | Zamir et al. | |
| 7,761,447 B2 | 7/2010 | Brill et al. | |
| 7,788,245 B1* | 8/2010 | Eddings et al. | 707/705 |
| 8,549,441 B2* | 10/2013 | Waldman et al. | 715/854 |
| 2002/0103789 A1 | 8/2002 | Turnbull et al. | |
| 2003/0120654 A1 | 6/2003 | Edlund et al. | |
| 2004/0098380 A1* | 5/2004 | Dentel et al. | 707/3 |
| 2004/0221226 A1* | 11/2004 | Lin et al. | 715/501.1 |
| 2004/0260679 A1 | 12/2004 | Best et al. | |
| 2004/0260680 A1* | 12/2004 | Best et al. | 707/3 |

(Continued)

OTHER PUBLICATIONS

Agichtein et al., "Improving Web Search Ranking by Incorporating User Behavior Information" SIGIR 06, Aug. 6-11, 2006, Seattle, WA, 8 pgs.

(Continued)

*Primary Examiner* — Pavan Mamillapalli
(74) *Attorney, Agent, or Firm* — Berkeley Law & Technology Group LLP

(57) ABSTRACT

The subject matter disclosed herein relates to ranking and/or indexing of documents based at least in part on user interaction with contextual shortcuts. In one or more implementations, data may be collected regarding user interaction with one or more contextual shortcuts and a query may be received from a user based at least in part on an activation of a given contextual shortcut. A search result may be transmitted to the user via a contextual search interface based at least in part on the collected data regarding user interaction with one or more contextual shortcuts.

20 Claims, 4 Drawing Sheets

(56) References Cited

U.S. PATENT DOCUMENTS

| | | |
|---|---|---|
| 2005/0065802 A1 | 3/2005 | Rui et al. |
| 2005/0071328 A1 | 3/2005 | Lawrence |
| 2005/0216454 A1 | 9/2005 | Diab et al. |
| 2006/0026013 A1 | 2/2006 | Kraft |
| 2006/0074883 A1* | 4/2006 | Teevan et al. ............. 707/3 |
| 2006/0167857 A1 | 7/2006 | Kraft et al. |
| 2006/0235860 A1 | 10/2006 | Brewer et al. |
| 2006/0294086 A1 | 12/2006 | Rose et al. |
| 2007/0033171 A1 | 2/2007 | Trowbridge |
| 2007/0050335 A1 | 3/2007 | Kashima et al. |
| 2007/0073669 A1 | 3/2007 | Kraft |
| 2007/0074102 A1 | 3/2007 | Kraft et al. |
| 2007/0100801 A1 | 5/2007 | Celik et al. |
| 2007/0106657 A1 | 5/2007 | Brzeski et al. |
| 2007/0143260 A1 | 6/2007 | Markov et al. |
| 2007/0214131 A1 | 9/2007 | Cucerzan et al. |
| 2007/0260598 A1* | 11/2007 | Odom ..................... 707/5 |
| 2007/0271247 A1 | 11/2007 | Best et al. |
| 2007/0271255 A1 | 11/2007 | Pappo |
| 2007/0283291 A1 | 12/2007 | Morris |
| 2007/0288492 A1 | 12/2007 | Chen et al. |
| 2008/0010252 A1 | 1/2008 | Zamir et al. |
| 2008/0021755 A1 | 1/2008 | Jones et al. |
| 2008/0031670 A1 | 2/2008 | Kim et al. |
| 2008/0033970 A1 | 2/2008 | Jones et al. |
| 2008/0147640 A1 | 6/2008 | Schachter |
| 2008/0235187 A1 | 9/2008 | Gade et al. |
| 2008/0243830 A1 | 10/2008 | Abhyanker |
| 2008/0313572 A1* | 12/2008 | Waldman et al. ......... 715/854 |
| 2009/0077037 A1* | 3/2009 | Wu et al. ................. 707/3 |
| 2009/0106257 A1* | 4/2009 | Iskold et al. ............. 707/10 |
| 2009/0119278 A1 | 5/2009 | Cross et al. |

OTHER PUBLICATIONS

Kraft et al., "Searching with Context" WWW 2006, May 23-26, 2006, Edinburgh, Scotland, 10 pgs.

Kraft et al., "Y!Q: Contextual Search at the Point of Inspiration" CIKM 05, Oct. 31-Nov. 5, 2005, Bremen, Germany, 8 pgs.

Kraft et al., "Mining Anchor Text for Query Refinement" WWW 2004, May 17-22, 2004, New York, NY, 9 pgs.

"Google Experimental Search Adds Personalized Page Ranking" Wired Blog Network, 1 page, http://blog.wired.com/monkeybites/2007/11/google-experime.html.

International Search Report and Written Opinion in PCT Application Serial No. PCT/US2009/001119 mailed Aug. 27, 2009, 8 pages.

"See and Find Quintura" Quintura, Inc., http://www.quinturacom, 1 page, 2005-2008.

U.S. Appl. No. 12/047,069, filed Mar. 12, 2008, 39 pages.

U.S. Appl. No. 12/047,069: Filing Receipt, mailed Mar. 27, 2008, 4 pages.

U.S. Appl. No. 12/047,069: Notice of Publication, mailed Sep. 17, 2009, 1 page.

U.S. Appl. No. 12/047,069: Non-Final Office Action, mailed May 20, 2010, 9 pages.

U.S. Appl. No. 12/047,069: Request for Reconsideration-After Non-Final Office Action, mailed Dec. 13, 2010, 14 pages.

U.S. Appl. No. 12/047,069: Final Office Action, mailed Mar. 3, 2011, 12 pages.

U.S. Appl. No. 12/048,792, filed Feb. 14, 2008, 43 pages.

U.S. Appl. No. 12/048,792: Filing Receipt, mailedMar. 25, 2008, 3 pages.

U.S. Appl. No. 12/048,792: Notice of Publication, mailed Sep. 17, 2009, 1 page.

U.S. Appl. No. 12/048,792: Non-Final Office Action, mailed Jun. 9, 2010, 14 pages.

U.S. Appl. No. 12/048,792: Request for Reconsideration-After Non-Final Office Action, mailed Sep. 9, 2010, 14 pages.

U.S. Appl. No. 12/048,792: Final Office Action, mailed Nov. 19, 2010, 17 pages.

U.S. Appl. No. 12/048,792: Request for Continued Examination, mailed Feb. 22, 2011, 23 pages.

U.S. Appl. No. 12/048,792: Non-Final Office Action, mailed Mar. 3, 2011, 27 pages.

U.S. Appl. No. 12/048,792: Non-Final Office Action, mailed Mar. 29, 2011, 27 pages.

U.S. Appl. No. 12/437,043, filed May 7, 2009, 42 pages.

U.S. Appl. No. 12/437,043: Filing Receipt, mailed May 21, 2009, 3 pages.

U.S. Appl. No. 12/437,043: Notice of Publication, mailed Nov. 12, 2010, 1 page.

U.S. Appl. No. 12/437,043: Non-Final Office Action, mailed Apr. 28, 2011, 19 pages.

U.S. Appl. No. 12/047,069: Non-Final Rejection, mailed Sep. 14, 2011, 10 pages.

U.S. Appl. No. 12/047,069: Amendment after final, filed Feb. 14, 2012, 19 pages.

U.S. Appl. No. 12/047,069: Final Rejection, mailed Jul. 3, 2012, 11 pages.

U.S. Appl. No. 12/048,792: Non-Final Office Action Response, mailed Sep. 23, 2011, 17 pages.

U.S. Appl. No. 12/048,792: Final Office Action, mailed Oct. 11, 2011, 28 pages.

U.S. Appl. No. 12/048,792: Abandonment, mailed Apr. 18, 2012, 2 pages.

U.S. Appl. No. 12/437,043: Non-Final Office Action Response, mailed Jul. 28, 2011, 18 pages.

U.S. Appl. No. 12/437,043: Non-Final Office Action, mailed Oct. 17, 2011, 11 pages.

U.S. Appl. No. 12/437,043: Amendment after Non-Final Office Action, mailed Feb. 17, 2012, 18 pages.

U.S. Appl. No. 12/437,043: Final Rejection, mailed Apr. 25, 2012, 16 pages.

U.S. Appl. No. 12/437,043: Request for continued examination, mailed Jul. 25, 2012, 28 pages.

CN 200980107845.8: Chinese office action mailed Apr. 6, 2012, 10 pages.

* cited by examiner

RANKING DOCUMENTS THROUGH CONTEXTUAL SHORTCUTS

BACKGROUND

Data processing tools and techniques continue to improve. Information in the form of data is continually being generated or otherwise identified, collected, stored, shared, and analyzed. Databases and other like data repositories are commonplace, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be analyzed in an efficient manner. Search engines, such as, for example, those provided over the web by Yahoo!, Google, and other web sites may be used by individuals to gather information. Typically, a user may input a query term and/or phrase and the search engine may return one or more links to sites and/or documents related to the query. The links returned may be related, or they may be completely unrelated, to what the user was actually looking for. The "relatedness" of results to the query may be in part a function of the actual query entered as well as the robustness of the search system (underlying collection system) used.

Other techniques for allowing a user to specify desired information have been developed. In some or most news stories found at the Yahoo! News web site, various word anchors may be highlighted in some fashion (underlined, for example) to indicate that the highlighted words represent keywords. The keyword anchors may be selected by the user (by clicking on the keyword anchors, for example) and additional information and/or documentation and/or links may be provided by a search engine or by some other agent. In this manner, the keyword anchors may help the user to gather additional information and to dig deeper into the subjects that the user desires to learn more about. For example, if a user is reading a news story and desires more information on a topic, the user may select a keyword anchor. A new box or window may open to provide the user with links to various other sources of information on the topic. The various sources of information may include, for example, related news stories, web sites, news photos, etc., that may add context to the topic.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
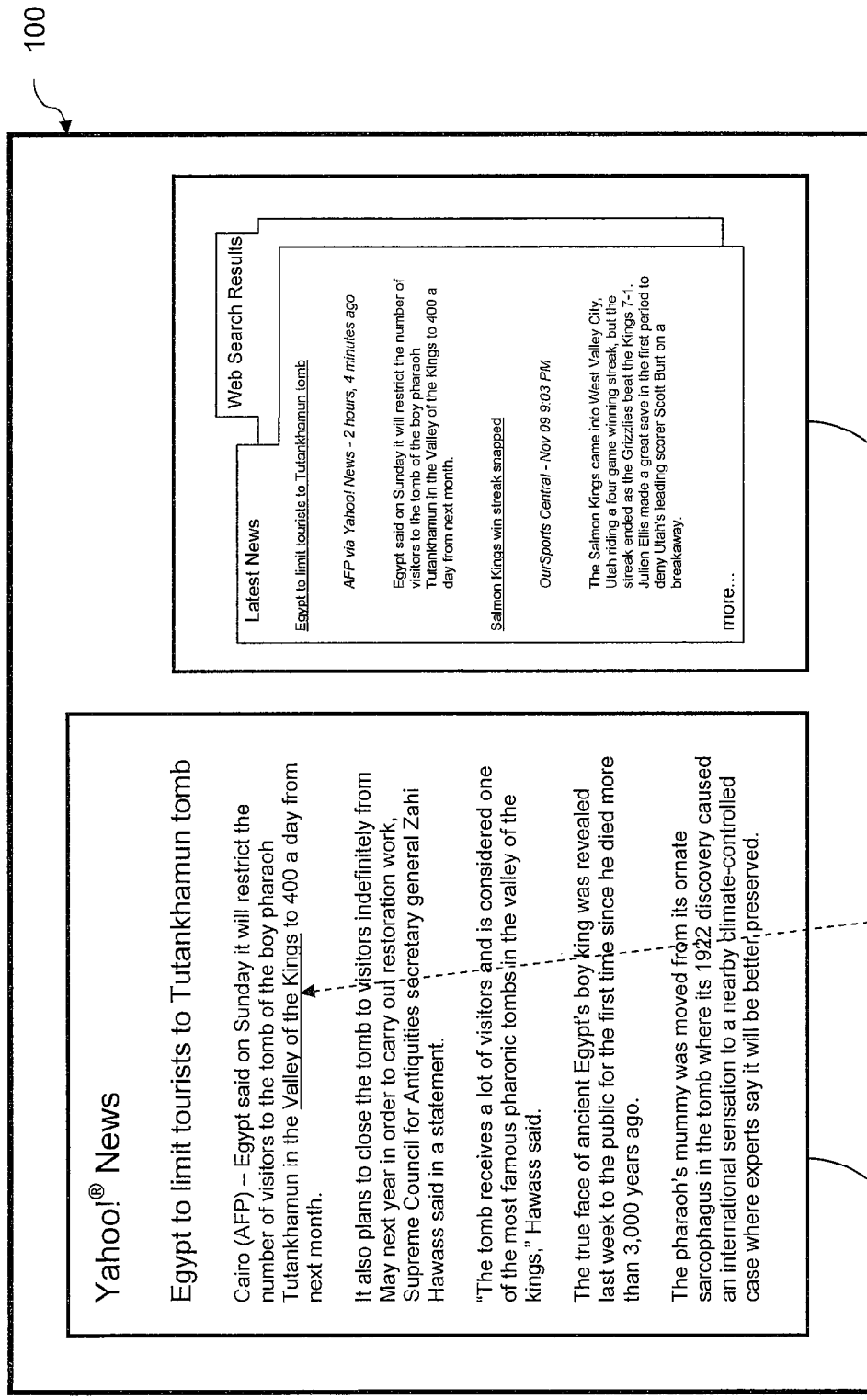
FIG. 1 is a diagram illustrating an example web browser display including a news story in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The Internet is a worldwide network of interconnected networks, which includes both public and private local and wide area networks of computers. One of the most commonly used Internet services is the World Wide Web ("WWW"), which consists of billions of content items, known as web pages, interconnected by hypertext links which allow users to navigate from a "source" page (the page containing the link) to a "target" page (the page pointed to by the link). Each page on the Web has a unique address known as a Uniform Resource Locator ("URL"). Hypertext links on the web contain two pieces of information: the URL of the target page, and a short piece of text, known as anchortext, that describes the target page.

Additionally or alternatively, other procedures may be utilized for navigating the Internet. As discussed above, one approach to allowing a user to specify desired information may include highlighting keyword anchors in an online document such as, for example, a news story on a web site. The keyword anchors may represent query terms and/or phrases that may be used by a search engine and/or other agent to provide links to other documents, web sites, and/or other media content. These keywords may also be referred to as "contextual shortcuts", in that they may provide shortcuts (links) to additional content related to the particular topic identified by the keyword.

Due to the large scale of the Internet and the unique nature of the interlinked pages, search engines may employ complex relevance ranking functions. As will be described in greater detail below, embodiments described herein may relate to ranking of electronic documents based at least in part on user interaction with contextual shortcuts. Additionally or alternatively, embodiments described herein may relate to indexing of electronic documents based at least in part on user interaction with contextual shortcuts. For example, embodiments described herein may rank electronic documents that contain entities and/or concepts detected through the use of contextual shortcuts. Log data of user interaction may be mined to indicate the number of times a contextual shortcut associated with a given entity and/or concept is clicked and/or hovered over with the mouse, for example. Such interaction information may be leveraged for use in computing the importance of an electronic document. For example, an importance score may be assigned to electronic documents that are annotated with contextual shortcuts. Such a score may then be employed as part of the overall ranking of the electronic document for search queries that contain the same and/or similar entities and/or concepts as detected in the electronic document. In an Internet search, entities and/or concepts may form a portion of the search formulation. Similar entities and/or concepts may be associated with data regarding user interaction. Accordingly, a search result set and/or ranking may take into account such user interaction with similar entities and/or concepts during compilation and/or ranking. For example, based at least in part on such mined user interaction data, if a user performs a search for an entity and/or concept, a higher importance may be given to those electronic documents that have received a higher number of user interactions for the same and/or similar entities and/or concepts. In other words, such electronic documents may be ranked higher if they have received a higher number of interactions from users with respect to contextual shortcuts associated with the same and/or similar entities and/or concepts.

As used herein, the term "electronic document" is meant to include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example, as may be displayed on a web page. Also, for one or more embodiments, the elements may comprise a graphical object, such as, for example, a digital image.

As used herein, the term "contextual shortcut" is meant to include any link, pointer, device, technique, etc., that if selected in some fashion by a user results in a computing platform retrieving and/or displaying information related to a term associated with the contextual shortcut and/or results in altering the appearance of information in the electronic document. Contextual shortcuts may comprise a user-centric entity detection platform, which may identify relevant and interesting phrases in text ("entities"), and which may convert such entities into actionable links ("shortcuts"), allowing the user to retrieve more information for these entities, e.g. search results, map views, etc. In an embodiment, a contextual shortcut may be represented by and/or associated with a portion of text, referred to herein as a "keyword anchor". Such a keyword anchor may be underlined, with the underlining denoting a user interface element co-located with the keyword anchor. Such a user interface element may be capable of linking to a contextual search interface. Additionally or alternatively, such a user interface element may comprise a device located so as to be separated from a keyword anchor, such as a button or the like, for example. Additionally, contextual shortcuts may comprise contextual content representing at least a portion of content of an electronic document associated with a keyword anchor. Such contextual content may be utilized as a context vector to represent at least a portion of content of a given electronic document.

FIG. 1 is a diagram illustrating an example web browser display 100. The display may be viewed by a user on an electronic device such as, for example, a computing platform. For this example, browser display 100 may be generated by a web browser application that facilitates navigation of the web by the user. The web browser may display any of a very wide range of information from a very wide range of web sites located across the web. For this example, browser display 100 depicts a news story 102 from a Yahoo!® News web site. Of course, this is merely an example of the types of information that may be displayed via the web browser, and the scope of claimed subject matter is not limited in this respect.

For this example, a contextual shortcut 104 ("Valley of the Kings") is embedded within news story 102. The underlining of the text "Valley of the Kings" for this example indicates to the user that the underlined text is associated with and/or represents a shortcut. If a user, upon reading news story 102, desires additional information regarding the subject of contextual shortcut 104, the user may select the contextual shortcut. For an embodiment, the user may select contextual shortcut 104 by "clicking" on the shortcut with a pointing device (such as, for example, a mouse), although the scope of claimed subject matter is not limited in this respect.

In response to selecting the contextual shortcut, a pop-up window 106 may be displayed. Pop-up window 106 may include additional information related to the subject of contextual shortcut 104. For this example, additional information related to the "Valley of the Kings" is displayed. The information may include, for example, hyperlinks to other web sites and/or other documents or stories within the same web site where additional information may be found. The information may also include photographs and/or other media content. Any of a wide range of information types may be included in the pop-up window. Although this example embodiment describes a pop-up window for displaying information to the user in response to a selection of a contextual shortcut, other embodiments may utilize other techniques for communicating the additional information to the user, and the scope of claimed subject matter is not limited in this respect. For example, the additional information may be presented in an overlay, and/or in a sidebar, although again, the scope of claimed subject matter is not limited in these respects. By providing contextual shortcut 104, the developers of the web site make it easier for the user to gather relevant information related to a topic of interest.

Conventional ranking systems may focus on mining interactions with result sets generated by a search engine. For example, features such as click data on the search result page and/or dwell time on a content page accessed through a search result have been utilized for adjusting search engine rankings. However, such conventional ranking systems may not provide a mechanism for indexing of electronic documents based on user interaction data. Specifically, as such conventional ranking systems focus on mining interactions with result sets generated by a search engine, there may be no opportunity for non-indexed electronic documents to be encompassed in such a procedure.

Conversely, embodiments described herein may be utilized to index electronic documents based on user interaction data. Some electronic documents may not be found in a search engine index. For example, recently added electronic documents, such as news articles, may be so current as to postdate a search engine index. However, such non-indexed electronic documents may already contain contextual shortcuts that may be associated with key concepts and/or entities. Such contextual shortcuts may be monitored so as to identify popular concepts and/or entities found within the content of such non-indexed electronic documents. Accordingly, non-indexed electronic documents may be identified by monitoring user interaction with contextual shortcuts in electronic documents. Such non-indexed electronic documents may then be incorporated into a search engine index, for example. Additionally or alternatively, such contextual shortcuts may be monitored so as to rank the relevance of a given electronic document. Accordingly, embodiments described herein may be utilized to rank some electronic documents within a result set even if such electronic documents have not been crawled from the Internet. Conversely, known techniques may only be capable of ranking the results that have already been crawled from the Internet.

Figure 2:
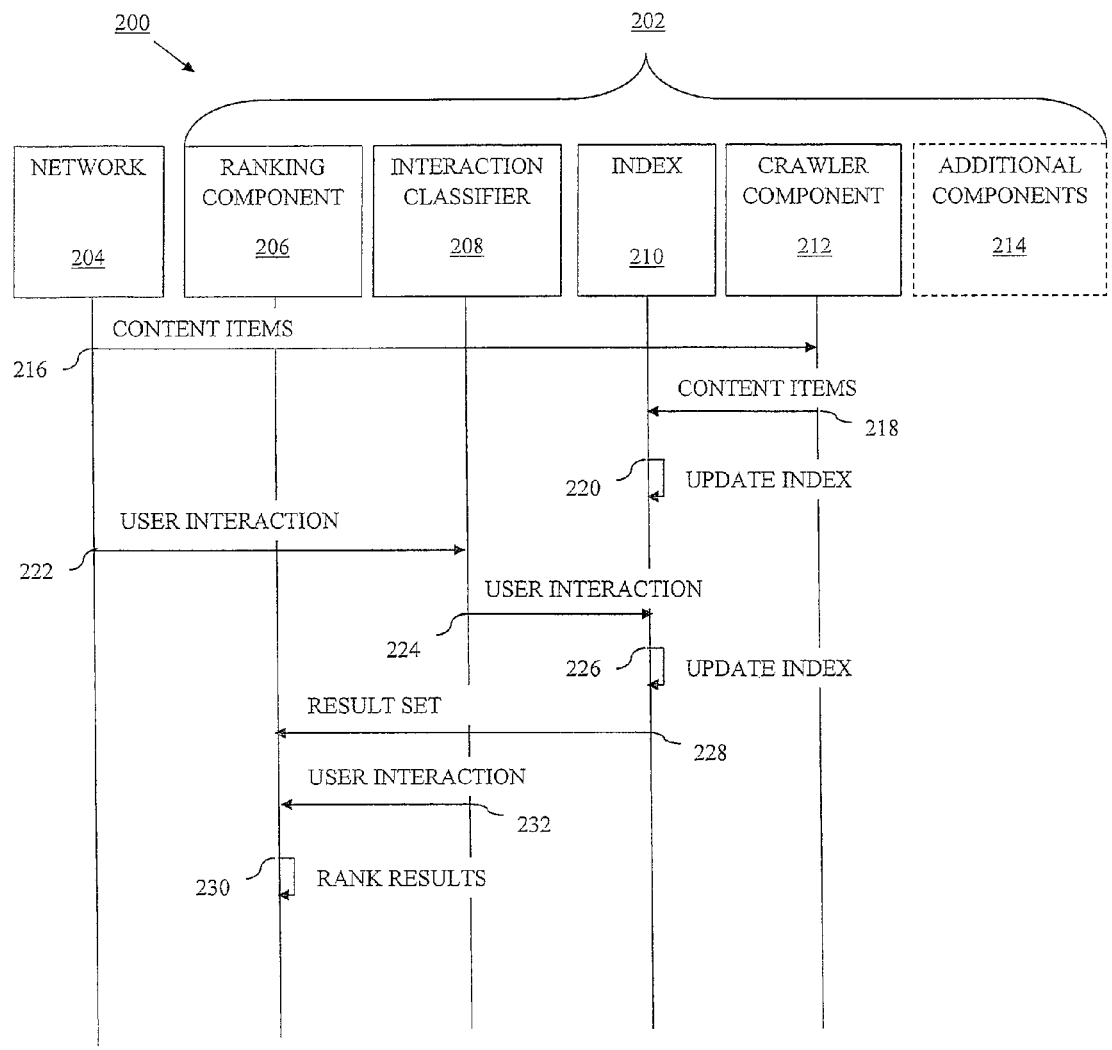
FIG. 2 is a flow diagram illustrating a procedure for indexing and/or ranking electronic documents in accordance with one or more embodiments.

Procedure 200 illustrated in FIG. 2 may be used to index and/or rank electronic documents in accordance with one or more embodiments, for example, although the scope of claimed subject matter is not limited in this respect. Additionally, although procedure 200, as shown in FIG. 2, comprises one particular order of actions, the order in which the actions are presented does not necessarily limit claimed subject matter to any particular order. Likewise, intervening actions not shown in FIG. 2 and/or additional actions not shown in FIG. 2 may be employed and/or actions shown in FIG. 2 may be eliminated, without departing from the scope of claimed subject matter.

Procedure 200 depicted in FIG. 2 may in alternative embodiments be implemented in software, hardware, and/or firmware, and may comprise discrete operations. As illustrated, procedure 200 governs the operation of a search engine 202. Search engine 202 may be capable of searching for content items of interest. Search engine 202 may communicate with a network 204 to access and/or search available information sources. By way of example, but not limitation, network 204 may include a local area network, a wide area network, the like, and/or combinations thereof, such as, for example, the Internet. Additionally or alternatively, search engine 202 and its constituent components may be deployed across network 204 in a distributed manner, whereby components may be duplicated and/or strategically placed throughout network 204 for increased performance.

Search engine 202 may include multiple components. For example, search engine 202 may include a ranking component 206, an interaction classifier 208, index 210, and/or a crawler component 212, as will be discussed in greater detail below. Additionally or alternatively, search engine 202 also may include additional components 214 that are not described in detail herein. For example, search engine 202 may also include a search component capable of searching the content items retrieved by crawler component 212.

Additionally, although the additional components 214 of search engine 202, as shown in FIG. 2, have been described above with non-limiting example components, the examples given do not necessarily limit claimed subject matter to any particular configuration. For example, further additional components 214 not discussed with respect to FIG. 2 may be employed, without departing from the scope of claimed subject matter. Further, although the additional components 214 of search engine 202, as shown in FIG. 2, have been described above with non-limiting example components, the examples given may be eliminated, without departing from the scope of claimed subject matter.

Crawler component 212 may retrieve content items from network 204, as illustrated at action 216. For example, crawler component 212 may retrieve content items and store a copy in a cache (not shown). Additionally, crawler component 212 may follow links between content items so as to navigate across the Internet and gather information on an extensive number of electronic documents. For example, such content items may comprise a set of electronic documents retrieved from network 204.

Data from content items gathered by crawler component 212 may be sent to index 210, as illustrated at action 218. Index 210 may index such content items, as illustrated at action 220. For example, index 210 may be updated based at least in part on content items comprising a set of electronic documents. Index 210 may parse a given content item into indexable terms, such as concepts and/or entities. Additionally, identifying information of the electronic documents associated with such concepts and/or entities may also be indexed so that a given concept and/or entity may be located via a corresponding electronic document. Index 210 may index terms and may store information regarding which documents contain a given concept and/or entity based at least in part on such indexed terms. However, index 210 may not necessarily index a complete series of terms associated with a given concept and/or entity. For example, an entity "Tom Cruise" may be indexed based at least in part on the single term "tom" and/or on the single term "cruise". In such a case, index 210 may store which electronic documents contain such single terms, and/or may store information regarding an offset and/or position of such single terms within such electronic documents. Accordingly, search engine 202 may determine which electronic documents contain an entity "Tom Cruise" based at least in part on checking a position of the individual terms "tom" and/or "cruise" within such electronic documents.

However, fresh electronic documents may be missed by the crawler component 212 and not incorporated into index 210 due to lack of links to such fresh electronic documents. Additionally or alternatively, there may be a time lag between when fresh electronic documents are created and when crawler component 212 may be capable of capturing such fresh electronic documents.

Interaction classifier 208 may collect data regarding user interaction with contextual shortcuts, as illustrated at action 222. For example, such data regarding user interaction with contextual shortcuts may be associated with a second set of electronic documents. The first set of electronic documents identified by crawler component 212 and the second set of electronic documents identified by interaction classifier 208 may share at least one common electronic document. Additionally or alternatively, the second set of electronic documents identified by interaction classifier 208 may comprise at least one electronic document not found in the first set of electronic documents identified by crawler component 212.

Interaction classifier 208 may send the collected data regarding user interaction with contextual shortcuts to index 210, as illustrated at action 224. As discussed above, such contextual shortcuts may comprise a keyword anchor associated with a context vector representing at least a portion of content of a given electronic document. Such a keyword anchor may comprise one or more words describing an entity and/or a concept. Further, such data regarding user interaction may comprise data regarding click interactions and/or hover interactions with contextual shortcuts associated with electronic documents. Index 210 may index such data regarding user interaction, as illustrated at action 226. For example, index 210 may be updated based at least in part on a second set of electronic documents that may or may not be co-extensive with the set of electronic documents identified by crawler component 212. Index 210 may parse a given electronic document into indexable words, such as concepts and/or entities. Identifying information of the electronic documents associated with such concepts and/or entities may also be indexed so that a given concept and/or entity may be located via a corresponding electronic document. Additionally, data regarding user interaction, such as click interactions and/or hover interactions with contextual shortcuts, may also be associated with a corresponding electronic document.

Ranking component 206 may receive a search result set from index 210, as illustrated at action 228. For example, search engine 202 may also include a search component (not shown) capable of searching the electronic documents indexed within index 210 so as to generate a result set. Ranking component 206 may be capable of ranking such a result set such that the most relevant electronic documents in the result set are presented to a user first, according to descending relevance, as illustrated at action 230. For example, the first electronic document in the result set may be the most relevant in response to a query and the last electronic document in the result set may be the least relevant while still falling within the scope of the query. Such a ranked result set may comprise a search result that may be transmitted to a user via a search interface. Such a ranking procedure may be based at least in part on the collected data regarding user interaction with contextual shortcuts and on the index. For example, collected data regarding user interaction with contextual shortcuts may be transferred to ranking component 206 via index 210.

Additionally or alternatively, collected data regarding user interaction with contextual shortcuts may be transferred to ranking component 206 via interaction classifier 208, as illustrated at action 232. For example, interaction classifier 208 may store such collected data regarding user interaction within a structure, such as an interaction index, for example. Such interaction indexing may be stored separate from index 210. For example, such interaction indexing may be stored within classifier 208 and/or a database separate from either classifier 208 and/or index 210. In such a case, index 210 may not store any of such collected data regarding user interaction with contextual shortcuts.

Once ranking component 206 has received a result set and collected data regarding user interaction with contextual shortcuts, ranking component 206 may determine an importance score associated with the electronic documents from the result set based at least in part on corresponding user interaction data. Such an importance score may be assigned to electronic documents depending on the level of user interaction with contextual shortcuts associated with such electronic documents. Such a score may then be employed as part of the overall ranking of the electronic document for search queries that contain the same and/or similar entities and/or concepts as detected in the electronic document. In an Internet search, entities and/or concepts may form a portion of the search formulation. Similar entities and/or concepts may be associated with data regarding user interaction. Accordingly, a search result set and/or ranking may take into account such user interaction with similar entities and/or concepts during compilation and/or ranking. For example, based at least in part on such mined user interaction data, if a user performs a search for an entity and/or concept, a higher importance may be given to those electronic documents that have received a higher number of user interactions for the same and/or similar entities and/or concepts. In other words, such electronic documents may be ranked higher if they have received a higher number of interactions from users with respect to contextual shortcuts associated with the same and/or similar entities and/or concepts.

Figure 3:
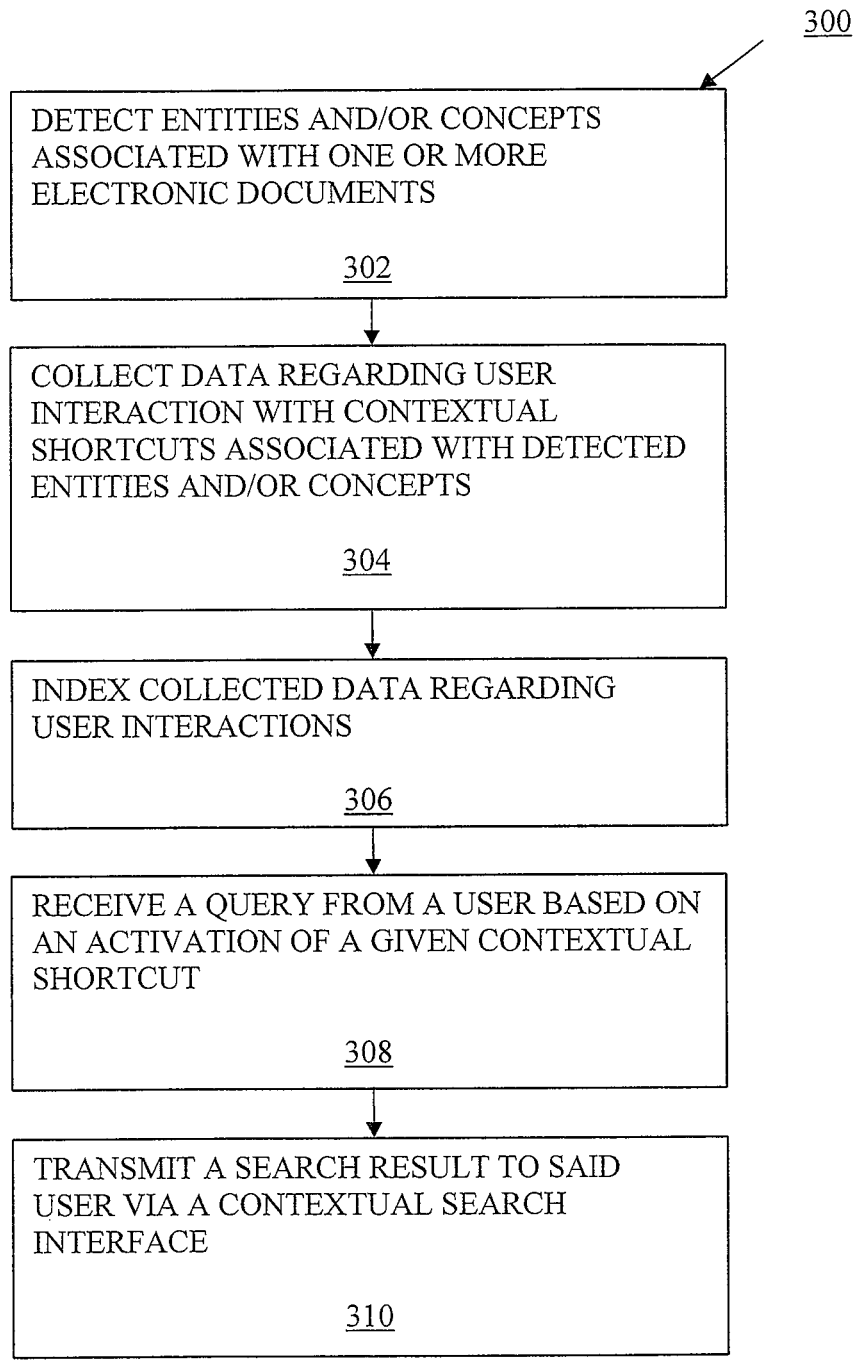
FIG. 3 is a flow diagram illustrating a procedure for indexing and/or ranking electronic documents in accordance with one or more embodiments.

Procedure 300, as illustrated in FIG. 3, may be used to rank electronic documents in accordance with one or more embodiments, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

Procedure 300, depicted in FIG. 3, may in alternative embodiments be implemented in software, hardware, and/or firmware, and may comprise discrete operations. As illustrated, procedure 300 may be used for ranking and/or indexing of documents based at least in part on user interaction with contextual shortcuts. Procedure 300 may be used for indexing of documents based at least in part on user interaction with contextual shortcuts starting at block 302 where entities and/or concepts associated with a given electronic document may be detected. For example, user-centric entity detection platform may identify relevant and interesting phrases in text ("entities and/or concepts"), and which may convert such entities and/or concepts into actionable contextual shortcuts, allowing the user to retrieve more information for these entities and/or concepts.

At block 304, data may be collected regarding user interaction with such contextual shortcuts. For example, such data regarding user interaction may comprise data regarding click interactions and/or hover interactions with contextual shortcuts associated with electronic documents.

At block 306, such collected data regarding user interaction may be indexed. For example, an index may parse a given electronic document into indexable words, such as concepts and/or entities. Identifying information of the electronic documents associated with such concepts and/or entities may also be indexed so that a given concept and/or entity may be located via a corresponding electronic document. Additionally, data regarding user interaction, such as click interactions and/or hover interactions with contextual shortcuts, may also be associated with a corresponding electronic document.

At block 308, a query may be received from a user based at least in part on an activation of a given contextual shortcut within a given electronic document. For example, a user may actuate a user interface element. Such a keyword anchor may be underlined, with the underlining denoting a user interface element co-located with the keyword anchor (such as illustrated at item 104 in FIG. 1). Such a user interface element may be capable of linking to a contextual search interface. Additionally or alternatively, such a user interface element may comprise a device located so as to be separated from a keyword anchor, such as a button or the like, for example. A result set may be generated from the indexed electronic documents based at least in part on the concepts and/or entities entered in such a query.

At block 310, a search result may be transmitted to a user via a contextual search interface (such as illustrated at item 106 in FIG. 1). Such a search result may be based at least in part on the collected data regarding user interaction with contextual shortcuts. Such collected data may be obtained via the indexing described at block 306 and/or may be obtained from a non-indexed repository of such collected data. A search result may be ranked such that the most relevant electronic documents in the result set are presented to a user first, according to descending relevance. The first electronic document in a search result may be the most relevant in response to a query and the last electronic document in a search result may be the least relevant while still falling within the scope of the query. Here, such a query may be based at least in part on an activation of a given contextual shortcut within a given electronic document. Collected data regarding user interaction with contextual shortcuts may be utilized to determine an importance score associated with a particular electronic document in a search result. Such an importance score may be assigned to a given electronic document depending on the level of user interaction with contextual shortcuts associated with that electronic document. Such a score may then be employed as part of the overall ranking of the electronic document for search queries that contain the same and/or similar entities and/or concepts as detected in the electronic document. In an Internet search, entities and/or concepts may form a portion of the search formulation. Similar entities and/or concepts may be associated with data regarding user interaction. Accordingly, a search result set and/or ranking may take into account such user interaction with similar entities and/or concepts during compilation and/or ranking. For example, based at least in part on such mined user interaction data, if a user performs a search for an entity and/or concept, a higher importance may be given to those electronic documents that have received a higher number of user interactions for the same and/or similar entities and/or concepts. In other words, such electronic documents may be ranked higher if they have received a higher number of interactions from users with respect to contextual shortcuts associated with the same and/or similar entities and/or concepts.

Additionally or alternatively, contextual shortcuts may comprise contextual content representing at least a portion of content of an electronic document associated with a keyword anchor. Such contextual content may be utilized as a context vector to represent at least a portion of content of a given electronic document. Such a content vector may also be utilized in the process of ranking the relevancy of electronic documents in the result set.

Figure 4:
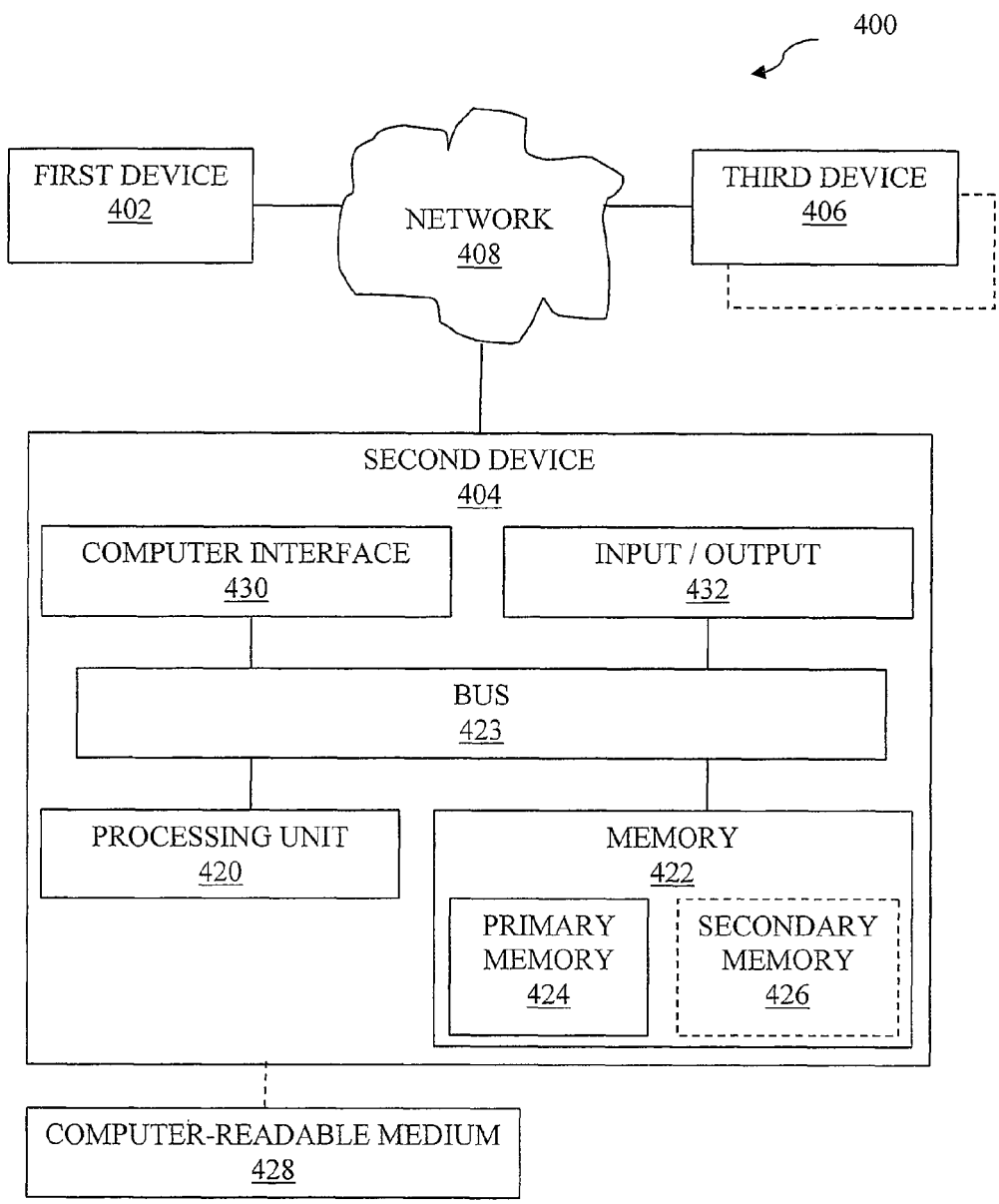
FIG. 4 is a schematic diagram of a computing platform in accordance with one or more embodiments.

FIG. 4 is a schematic diagram illustrating an exemplary embodiment of a computing environment system 400 that may include one or more devices configurable to rank and/or index electronic documents based at least in part on user interaction with contextual shortcuts using one or more techniques illustrated above, for example. System 400 may include, for example, a first device 402, a second device 404, and a third device 406, which may be operatively coupled together through a network 408.

First device 402, second device 404, and third device 406, as shown in FIG. 4, may be representative of any device, appliance or machine that may be configurable to exchange data over network 408. By way of example, but not limitation, any of first device 402, second device 404, or third device 406 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 408, as shown in FIG. 4, is representative of one or more communication links, processes, and/or resources configurable to support the exchange of data between at least two of first device 402, second device 404, and third device 406. By way of example, but not limitation, network 408 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 406, there may be additional like devices operatively coupled to network 408.

It is recognized that all or part of the various devices and networks shown in system 400, and the processes and methods as further described herein, may be implemented using, or otherwise including, hardware, firmware, software, or any combination thereof.

Thus, by way of example, but not limitation, second device 404 may include at least one processing unit 420 that is operatively coupled to a memory 422 through a bus 423.

Processing unit 420 is representative of one or more circuits configurable to perform at least a portion of a data computing procedure or process. By way of example, but not limitation, processing unit 420 may include one or more processors, controllers, microprocessors, microcontrollers, application specific integrated circuits, digital signal processors, programmable logic devices, field programmable gate arrays, and the like, or any combination thereof.

Memory 422 is representative of any data storage mechanism. Memory 422 may include, for example, a primary memory 424 and/or a secondary memory 426. Primary memory 424 may include, for example, a random access memory, read only memory, etc. While illustrated in this example as being separate from processing unit 420, it should be understood that all or part of primary memory 424 may be provided within or otherwise co-located/coupled with processing unit 420.

Secondary memory 426 may include, for example, the same or similar type of memory as primary memory and/or one or more data storage devices or systems, such as, for example, a disk drive, an optical disc drive, a tape drive, a solid state memory drive, etc. In certain implementations, secondary memory 426 may be operatively receptive of, or otherwise configurable to couple to, a computer-readable medium 428. Computer-readable medium 428 may include, for example, any medium that can carry and/or make accessible data, code and/or instructions for one or more of the devices in system 400.

Second device 404 may include, for example, a communication interface 430 that provides for or otherwise supports the operative coupling of second device 404 to at least network 408. By way of example, but not limitation, communication interface 430 may include a network interface device or card, a modem, a router, a switch, a transceiver, and the like.

Second device 404 may include, for example, an input/output 432. Input/output 432 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 432 may include an operatively configured display, speaker, keyboard, mouse, trackball, touch screen, data port, etc.

With regard to system 400, in certain implementations, first device 402 may be configurable to tangibly embody all or a portion of procedure 200 of FIG. 2 and/or procedure 300 of FIG. 3. In certain implementations, first device 402 may be configurable to rank and/or index electronic documents based at least in part on user interaction with contextual shortcuts using one or more techniques illustrated above. For example, we can apply a process in first device 402 where a plurality of electronic documents may be provided, such as from a database, crawled from Internet, and/or from a result of an Internet search, for example. First device 402 may analyze each of the electronic documents and calculate an importance score for each electronic document. First device 402 may determine an importance score associated with the electronic documents from such a result set based at least in part on corresponding user interaction data. Such an importance score may be assigned to electronic documents depending on the level of user interaction with contextual shortcuts associated with such electronic documents. Alternatively or additionally, first device 402 may index electronic documents based on a detection of collected data regarding user interaction with contextual shortcuts in addition to or in place of web crawler-type indexing.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
    recording user interactions from a plurality of users with one or more contextual shortcuts, said one or more contextual shortcuts comprising one or more user-selectable keyword anchors;
    updating an index based, at least in part, on said user interactions from said plurality of users, said updating comprising adding at least one previously non-indexed electronic document to said index at least partially in response to receiving one or more user interactions with said one or more contextual shortcuts contained within said at least one previously non-indexed electronic document, wherein said index is searchable by said plurality of users;
    receiving a search query from a user based, at least in part, on a user selection of a given user-selectable keyword anchor associated with a contextual shortcut; and
    performing a search query on one or more electronic documents of said index based, at least in part, on said user selection of said given user-selectable keyword anchor in an electronic document to determine a ranked list of electronic documents associated with said search query, wherein said ranked list is determined based at least in part on the recorded said user interactions from the plurality of users.

2. The method of claim 1, wherein said one or more contextual shortcuts are associated with one or more web pages.

3. The method of claim 1, wherein said contextual shortcut comprises said user-selectable keyword anchor, contextual content representing at least a portion of content of an electronic document associated with said keyword anchor, and a user interface element to link to a contextual search interface, and wherein said user interface element is co-located with said keyword anchor.

4. The method of claim 1, wherein said user interactions comprise at least one of a click interaction or a hover interaction.

5. The method of claim 1, further comprising:
    indexing said recorded user interactions; and
    transmitting said ranked list of electronic documents to said user via said contextual search interface based at least in part on said indexed recorded user interactions.

6. The method of claim 1, further comprising transmitting said ranked list of said electronic documents to said user via a contextual search interface based at least in part on a given contextual content associated with said given user-selectable keyword associated with said contextual shortcut.

7. The method of claim 1, further comprising transmitting a search result to said user via a contextual search interface based, at least in part, on said recorded user interactions with said one or more contextual shortcuts, wherein said search result comprises said ranked list of said one or more electronic documents associated with said search query.

8. A method, comprising: retrieving a first set of electronic documents;
recording user interactions with contextual shortcuts in a second set of electronic documents, wherein said contextual shortcuts comprise associated keyword anchors and user-selectable links relating to said keyword anchors, said keyword anchors being associated with a context vector representing at least a portion of content of a given electronic document of said second set of electronic documents;
updating an index of said second set of electronic documents based, at least in part, on said user interactions from said plurality of users, said updating comprising adding at least one previously non-indexed electronic document to said index at least partially in response to receiving one or more user interactions with said one or more contextual shortcuts contained within said at least one previously non-indexed electronic document, wherein said index is searchable by said plurality of users;
determining a score for said given electronic document based, at least in part, on user selections of said user-selectable links of said contextual shortcuts within said given electronic document; and
updating said index based, at least in part, on said first set of electronic documents and said score; and
updating a ranking of individual ones of the first set of electronic documents is determined based, at least in part, on the recorded said user interactions from said plurality of users.

9. The method of claim 8, wherein said first and second set of electronic documents share at least one common electronic document.

10. The method of claim 8, wherein said second set of electronic documents comprises at least one electronic document not found in said first set of electronic documents.

11. The method of claim 8, wherein said given electronic document comprises a web page.

12. The method of claim 8, wherein said keyword anchor comprises one or more words describing at least one of an entity or a concept.

13. The method of claim 8, wherein said user interactions comprise at least one of a click interaction or a hover interaction.

14. An article comprising:
a storage medium comprising machine-readable instructions stored thereon which, are executable by a computing platform to:
record user interactions from a plurality of users with one or more contextual shortcuts, said one or more contextual shortcuts to comprise one or more user-selectable keyword anchors;
update an index to be based, at least in part, on said user interactions from said plurality of users, said update to at least add at least one previously non-indexed electronic document to said index at least partially in response to receipt of one or more user interactions with said one or more contextual shortcuts to be contained within said at least one previously non-indexed electronic document, wherein said index is to be searchable by said plurality of users;
process a search query from a user to be based, at least in part, on a user selection of a given user-selectable keyword anchor to be associated with a contextual shortcut; and perform a search query on said indexed one or more electronic documents based, at least in part, on said user selection of said given user-selectable keyword anchor in an electronic document to determine a ranked list of said one or more electronic documents to be associated with sad search query, wherein said ranked list is determined based at least in part on the recorded said user interactions from the plurality of users.

15. The article of claim 14, wherein said machine-readable instructions which are further executable by the computing platform to:
index said user interactions to be recorded; and
transmit said ranked list of the one or more electronic documents to said user via said contextual search interface to be based, at least in part, on said user interactions to be indexed.

16. The article of claim 14, wherein said machine-readable instructions which are further executable by the computing platform to initiate transmission of said ranked list of the one or more electronic documents to said user via a contextual search interface to be based, at least in part, on a given contextual content to be associated with said given contextual shortcut.

17. An apparatus comprising; a computing platform, said computing platform to: retrieve a first set of electronic documents;
record user interactions with contextual shortcuts in a second set of electronic documents, said contextual shortcuts to comprise associated keyword anchors and user-selectable links to be related to said keyword anchors, said keyword anchors to be associated with a context vector to represent at least a portion of content of a given electronic document;
update an index in said second set of electronic documents to be based, at least in part, on said user interactions from a plurality of users, said update to comprise to at least one previously non-indexed electronic document to be added to said index at least partially in response to receipt of one or more user interactions to be received with said one or more contextual shortcuts to be contained within said at least one previously non-indexed electronic document, wherein said index is to be searchable by said plurality of users;
determine a score for said given electronic document to be based, at least in part, on user selections of said user-selectable links of said contextual shortcuts to be within said given electronic document;
update an index to be based, at least in part, on said first set of electronic documents and said score; and
updating a ranking of individual ones of the first set of electronic documents is determined based, at least in part, on the recorded said user interactions from said plurality of users.

18. The apparatus of claim 17, wherein said first and second set of electronic documents are to share at least one common electronic document.

19. The apparatus of claim 17, wherein said second set of electronic documents to comprise at least one electronic document not found in said first set of electronic documents.

20. The apparatus of claim 17, said computing platform to:
update said index based, at least in part, on said data to be collected regarding user interaction to be associated with said keyword anchors;
said second set of electronic documents to comprise at least one electronic document not in said first set of electronic documents;
said electronic document to comprise a web page;
said keyword anchor to comprise one or more words to describe an entity or a concept; and
said interaction to comprise at least one of a click interaction or a hover interaction.

* * * * *